Dec. 14, 1937. L. C. PONTING ET AL Re. 20,586

ELEVATOR BUCKET

Original Filed April 3, 1934

INVENTORS:
Leonard C. Ponting
and Arthur G. Kliwer,
By Chas. C. Gerard
ATTORNEY

Reissued Dec. 14, 1937

Re. 20,586

UNITED STATES PATENT OFFICE 20,586

ELEVATOR BUCKET

Leonard C. Ponting, Pawtucket, R. I., and Arthur G. Kliwer, Abilene, Kans.,

Original No. 2,031,064, dated February 18, 1936, Serial No. 718,841, April 3, 1934. Application for reissue June 19, 1937, Serial No. 149,264

4 Claims. (Cl. 198—152)

This invention relates to elevator buckets, and has for the primary object the provision of a device of the above stated character which will completely empty itself when dumped by preventing the development of a partial vacuum therein and also will travel through the return leg of a conveyor housing without generating abnormal air currents therein which heretofore exist with the use of the conventional type of buckets, and which air currents cause considerable trouble in replacing of inspection doors after their removal to permit inspection to be made to the interior of the conveyor housing.

With these and other objects in view this invention consists in certain novel features of construction, combination and arrangement of parts to be hereinafter more fully described and claimed.

For a complete understanding of our invention, reference is to be had to the following description and accompanying drawing, in which Figure 1 is a perspective view illustrating a bucket constructed in accordance with our invention.

Figure 1:
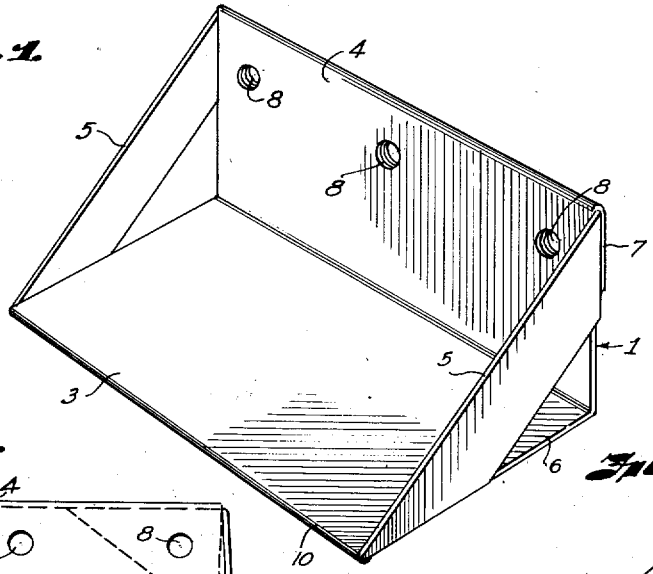
Figure 2:
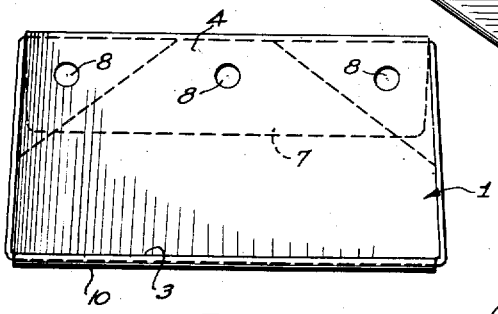
Figure 2 is a front elevation illustrating the same.
Figure 3:
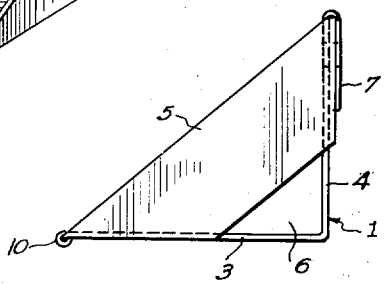
Figure 3 is an end elevation illustrating the device.
Figure 4:
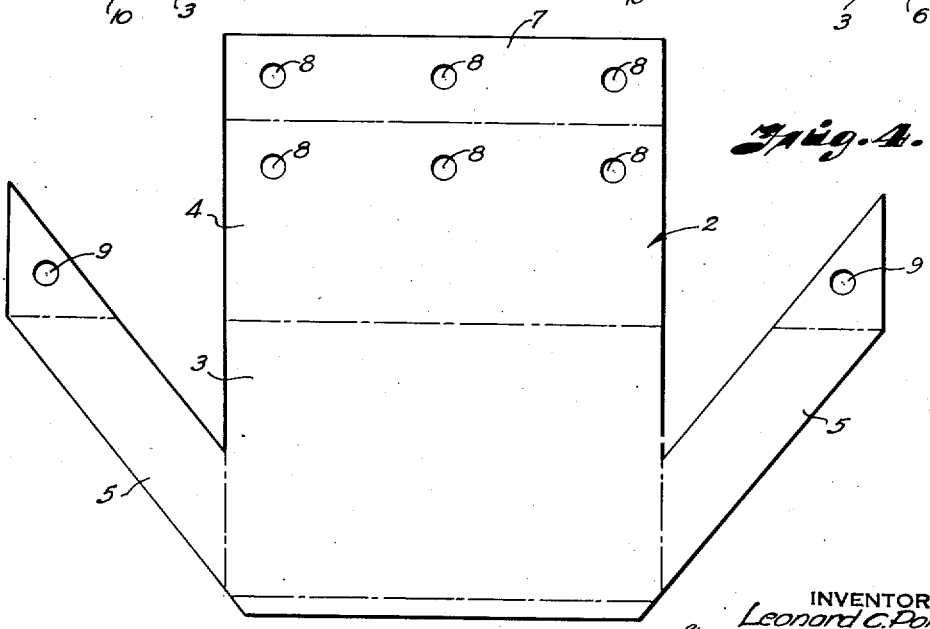
Figure 4 is a plan view illustrating a blank from which the bucket is constructed and showing also the holes punched therein after being formed into bucket shape as illustrated in Figures 1 to 3.

Referring in detail to the drawing the numeral 1 indicates a bucket constructed from a single piece of material. The material is cut or stamped in the form of a blank 2, as shown in Figure 4. The blank is folded and bent on the dotted line disclosed in Figure 4 to form angularly related walls 3 and 4 and side members 5. The side members are arranged on an inclined plane between the portions 3 and 4 leaving openings or spaces 6 allowing escape of air from the bucket when in use to prevent partial vacuum from being developed in the bucket. The portion 4 is bent upon itself to form a retaining flange 7 and when the bucket is formed as shown in Figures 1 to 3 the portion 4 and flange 7 are punched with aligned openings 8 for the purpose of receiving bolts or like fasteners securing the bucket to a conveyor belt. The side members 5 are bent on the dotted lines shown in Figure 4 to lie between the flange 7 and the portion 4 where they are punched with openings aligning with certain of the openings 8 so that the members 5 are secured to the portion 4 by the fasteners employed in securing the bucket to the conveyor belt. The free edge of the portion 3 is bent or rolled to form a beading 10 adapted to act as a reinforcement and also providing to the bottom portion 3 a finished free edge.

A bucket constructed in accordance with the foregoing and operating on an endless conveyor within a conveyor housing will more readily empty itself when properly positioned due to the openings 6 permitting air to escape from the bucket and consequently obviating the possibility of a partial vacuum to be established therein, which would have a tendency to hold or prevent the entire load of the bucket from emptying therefrom. A bucket of this character when traveling on the return leg of the conveyor housing will aid in reducing air currents in the housing to a minimum, due to its permitting free movement of air into and out of the bucket, which reduction of air currents in the housing promotes cleaner conditions as regards dust and keeps the housing from choking up. Very important advantages resulting from this are that a great deal less suction is required to be applied to the housing for removing dust, with less waste of material, and the product itself is benefited because less suction results in less moisture being removed from the material. The side openings are also a safeguard against the pocketing of dangerous explosive gases, and further facilitate the operation of fumigating the equipment; and being lighter in weight, lighter belting can be used with a saving also in power required to operate the elevator.

It is moreover obvious that where the elevator is equipped with buckets which discharge more efficiently and completely, as in the present construction, the capacity of the elevator is increased to the extent that recirculation of the material is eliminated.

While we have shown and described the preferred embodiment of our invention, it will be understood that minor changes in construction, combination and arrangement of parts may be made without departing from the spirit and scope of our invention, as claimed.

Having described the invention, we claim:

1. A bucket comprising vertically and horizontally arranged and integrally connected walls, side members integral with the horizontal wall and bent to engage one face of the vertical wall, said side members spaced from the horizontal and vertical walls where said walls join each other to form openings, a flange formed on the vertical wall and overlying the ends of the side members, said vertical wall, the flange and the ends of the side members having aligned openings to receive fasteners for securing the vertical wall to a conveyor belt and simultaneously securing the ends of the side members to the vertical wall, said horizontal wall having its free edge rolled to form a beading.

2. An elevator bucket for endless carrier belts operating within conveyor housings having side walls traversed by the sides of the bucket, comprising a horizontal bottom, an upwardly projecting back wall at the rear edge of said bottom, and side portions forming bottom supporting members connecting the forward portions of the ends of said bottom with upper portions of said back wall, both of said side portions being constructed to provide air vent openings at the corresponding sides of the bucket in position for traversing the inner faces of the side walls of the conveyor housing and located substantially within the planes of the corresponding sides of the bucket.

3. An elevator bucket for endless carrier belts operating within conveyor housings having side walls traversed by the sides of the bucket, comprising a horizontal bottom, an upwardly projecting back wall at the rear edge of said bottom, and side portions forming bottom supporting members connecting the forward portions of the ends of said bottom with upper portions of said back wall, each of said side portions being cut away at the angle between said bottom and back wall to provide a rear corner vent opening at the corresponding side of the bucket in position for traversing the inner face of the adjacent side wall of the conveyor housing.

4. A one piece elevator bucket for endless carrier belts operating within conveyor housings having side walls traversed by the sides of the bucket, comprising a blank cut to provide a horizontal bottom and a back wall and side walls integrally connected thereto, said back wall projecting upwardly from the rear edge of said bottom, and said side portions directly connecting the upper corners of said back wall with the forward portions of the ends of said bottom and being also cut away to provide rear corner vent openings at the corresponding sides of the bucket in position for traversing the inner faces of the side walls of the conveyor housing.

ARTHUR G. KLIWER.
LEONARD C. PONTING.